United States Patent [19]

Nicks

[11] 4,061,028
[45] Dec. 6, 1977

[54] AIRCRAFT TOTAL ENERGY SENSOR

[76] Inventor: Oran W. Nicks, 425 Elizabeth Lake Drive, Hampton, Va. 23669

[21] Appl. No.: 772,166

[22] Filed: Feb. 25, 1977

[51] Int. Cl.² ............................................. G01C 21/00
[52] U.S. Cl. ...................................................... 73/179
[58] Field of Search ...................... 73/178 R, 182, 212, 73/179

[56] References Cited

U.S. PATENT DOCUMENTS

| 2,923,152 | 2/1960 | Mabry, Jr. et al. | 73/179 |
| 3,748,900 | 7/1973 | Lindquist | 73/178 R |

FOREIGN PATENT DOCUMENTS 530,260  7/1954  Belgium ................................ 73/182

*Primary Examiner*—Jerry W. Myracle
*Attorney, Agent, or Firm*—Wallace J. Nelson; Howard J. Osborn; John R. Manning

[57] ABSTRACT

An inexpensive total energy sensor utilizing the principles of laminar flow separation around a small cylinder having the desired relationship between static and dynamic pressures for use with sensitive rate of climb instruments for maximum utilization of external pressures by aircraft, in general, and sailplanes in particular.

11 Claims, 5 Drawing Figures

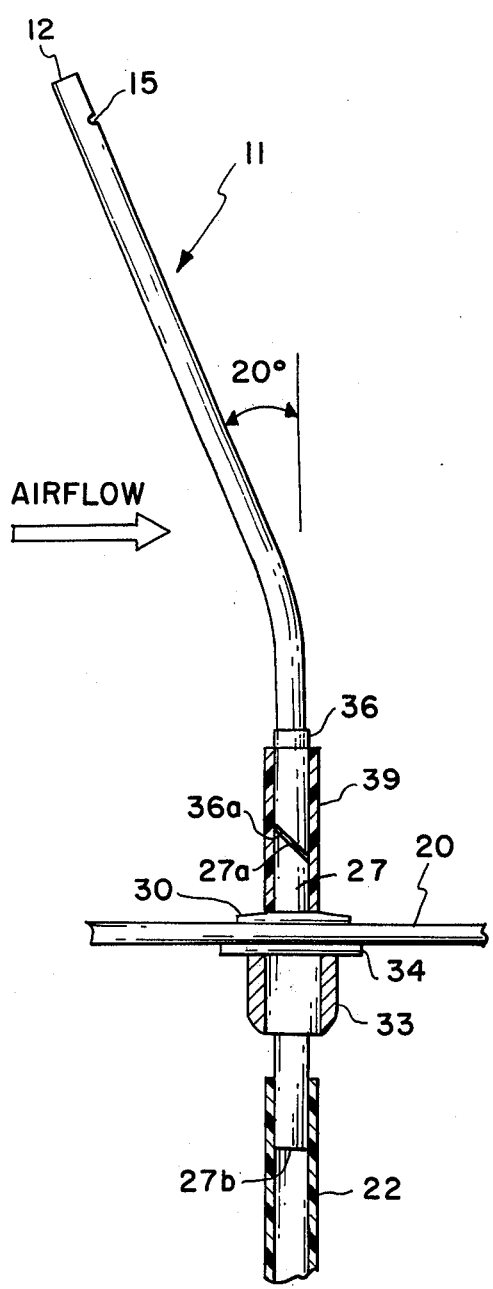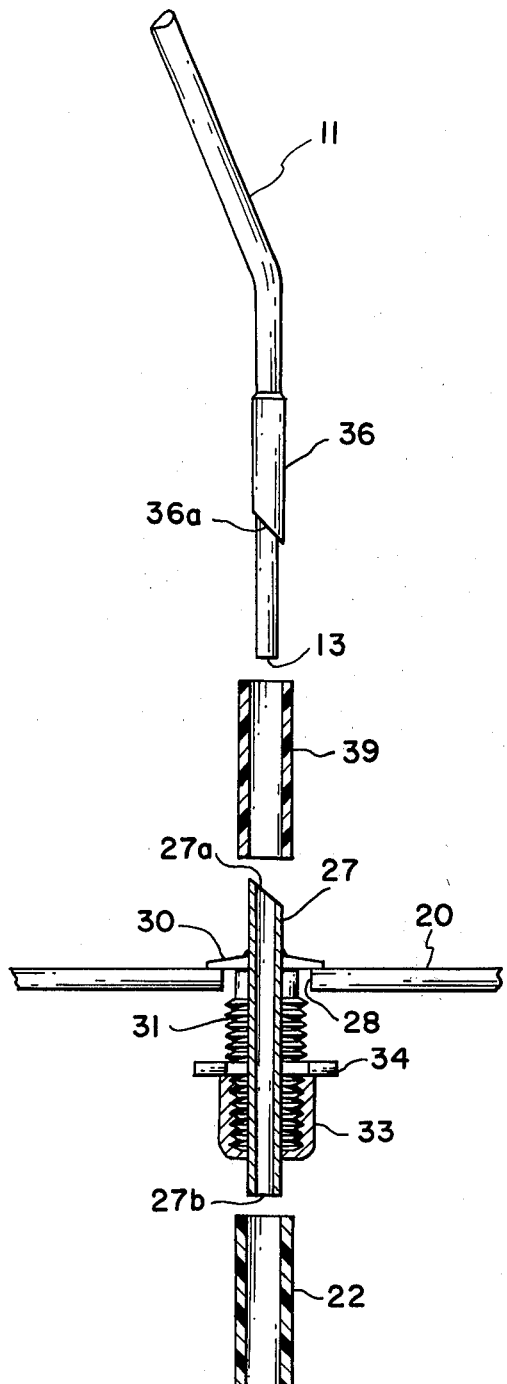

AIRCRAFT TOTAL ENERGY SENSOR

ORIGIN OF THE DISCLOSURE

The invention described herein was made by an employee of the United States Government and may be manufactured and used by or for the Government for governmental purposes without the payment of any royalties thereon or therefor.

BACKGROUND OF THE INVENTION

A sailplane owes its performance to the utilization of energy supplied from external sources. Sensitive rate of climb instruments or variometers connected to static pressure sources are commonly used to indicate rising or sinking of the sailplane.

The ability of a sailplane to remain aloft for long periods of time, or to cover significant cross-country distances, is dependent upon its effective use of energy supplied by external sources. For this reason, clear and accurate information concerning the total energy situation and its rate of change are extremely significant to successful soaring. While there are many factors involved in a rigorous treatment of total energy, it is possible for a pilot to interpret his total energy situation with simple modifications to a variometer system. Several methods have previously been used to provide dynamic pressure compensation for rate of climb when zooming or diving, so that the variometer indicates rate of change in total energy instead of rate of change in potential energy. The most widely used compensators have been of two types: diaphragm-volume systems and venturi systems. However, these systems have not proved adequate in continuous flight to give an immediate reading to the pilot of a sailplane of the total energy available, and of rates of change in total energy.

The total energy of a sailplane at a given time is the sum of its potential and kinetic energies. A pilot customarily determines his total energy situation by a glance at the altimeter and the air speed indicator. In addition to sensing indications of the absolute value of total energy, it is important to "energy management" that the pilot also be able to sense the rate of change in total energy at all times.

The rate of change in total energy is primarily affected by the drag of the sailplane which is constantly reducing the useful energy, and the air mass energy effects on the sailplane. The drag is dependent on the aerodynamic characteristics of the sailplane, its velocity, altitude, and the load factor. There is little a pilot can do about the aerodynamic characteristics of his sailplane in flight; however, he can control the velocity and the load factor affected by maneuvers. The air mass will be producing sink, climb, or velocity increments to the sailplane which are dependent on its characteristics and the pilot's skill in positioning the sailplane with respect to local air currents.

In summary, the useful total energy from a pilot's viewpoint may be thought of as the instantaneous total energy associated with his given altitude and velocity, less the energy being dissipated by the drag of the sailplane moving along its flightpath, plus the energy being added to the sailplane by the air mass.

PRIOR ART

Several forms of variometers exist which give accurate rate of climb information. Most of these instruments work on a principle of pressure drop across an orifice or mass flow measurements to and from a reference volume. When connected to a static pressure source, they offer a good indication of rate of change in altitude or rate of potential energy change. If an altitude change occurs at a constant velocity, this reading also represents the rate of change in total energy.

If the same variometer could be connected to a pressure source which not only varies with the static pressure, but also inversely with the dynamic pressure, it would be possible to use the same instrument for indicating rates of change in total energy.

Several forms of total energy sensors have been previously developed. In 1940, Kantrowitz described the principles of such a technique. The Irving venturi was a well known approach to this matter and more recently, the Althaus venturi has been widely used. Along with these venturi techniques, many diaphragm systems have been successfully used, one of the most recent being the Schuemann compensator. A recent probe compensator, known as the Braunschweig tube, uses similar principles to those applied in the present invention. However, these prior art devices are relatively expensive, difficult to make, and extremely sensitive to manufacturing tolerances.

It is therefore an object of the present invention to provide an inexpensive, easy to construct, sensitive aircraft sensor to detect and provide a signal that will indicate rates of change in total energy during aircraft flight.

It is a further object of the present invention to provide an inexpensive total energy sensor for use with an aircraft.

It is another object of the present invention to provide a sensitive total energy sensor to facilitate sailplane flight.

A further object of the present invention is to provide a sensor probe that utilizes a single pressure that varies in proportion to the total energy rate of change of an attached aircraft.

An additional object of the present invention is to provide an aircraft sensor that detects pressure at a single orifice that is a proper combination of the total and static pressures to give an indication of changes in total energy available to the aircraft.

Another object of the present invention is to provide a total energy sensor probe that exhibits good compensation over a wide speed and altitude range, is relatively insensitive to flow direction, is easily constructed and produces relatively low drag in use.

BRIEF SUMMARY OF THE INVENTION

According to the present invention the foregoing and other objects are attained by providing a simple total energy sensor which consists of a small cylinder mounted on an aircraft and angularly inclined forward in the direction of aircraft flight. The cylinder is provided with a single orifice in the aft facing direction at a specific location from the closed cylinder end so that air pressure detected by the orifice will be a proper combination of the total and static pressures and proportional to changes in the total energy of the aircraft. The sensor is in fluid connection with a sensitive rate of climb instrument or variometer and thus provides an instantaneous response to changes in useful total energy for the pilot of the aircraft. This instantaneous indication of changes in useful total energy serves to assist in the piloting of aircraft, in general, and for sailplanes in particular.

In still air, a sailplane flying at high speeds could exchange most of its kinetic energy for potential energy by zooming. If the sailplane had no drag, the energy exchange would be complete, and a perfect total energy instrument would indicate no change in total energy for such a transfer. Thus, a sensitive variometer could be converted to function as a total energy instrument if the ambient static pressure source were replaced by a pressure source appropriately combining pressures related to the aircraft altitude and velocity. For the imaginary sailplane with no drag, a perfect total energy pressure source would simply provide constant pressure to the instrument throughout the zoom, with the decreasing pressure due to increase in altitude being exactly compensated by a pressure increase inversely proportional to the change in the square of the velocity.

It is customary to refer to pressures in a non-dimensional form called pressure coefficients, defined by $$C_{P_{Local}} = (P_{Local} - P_{Ambient})/q$$

where:
$C_{PLocal}$ = Local Pressure Coefficient
$P_{Local}$ = local or sensor pressure source
$P_{Ambient}$ = static pressure
$q$ = dynamic pressure Since $P_{Local}$ for a total energy sensor should use the difference of the ambient and dynamic pressures, the required pressure coefficient
$C_p = 1.0$, i.e.,
for $P_{sensor} = P_{Ambient} - q$
$C_{P_{Sensor}} = (P_A - q) - P_A/q = -1.0$ For the actual case of a sailplane with drag gliding in still air, the variometer sink rate reading with such a source would simply be the sailplane polar value associated with the speed being flown. Thus, the use of a variometer with simple total energy compensation depends on a pilot knowing his polar relationships so that he can easily judge whether rising or sinking air is modifying his sink rate for the known flight speed. This is commonly done by accomplished pilots. It is also possible through recent developments of "netto" variometers, which factor the sailplane polar into the variometer reading, to obtain a direct indication of up and down movements of the air regardless of how the sailplane drag is varying. It is also necessary to use some form of total energy compensation with netto variometers however, and the probe of the present invention is applicable to either form of total energy compensation.

DETAILED DESCRIPTION

A more complete appreciation of the invention and many of the attendant advantages thereof will be readily apparent as the same becomes better understood by reference to the following detailed description when considered in connection with the accompanying drawings wherein:

FIG. 2 is an enlarged part section view taken along line 2—2 of FIG. 1 and showing details of the total energy sensor probe;

FIG. 3 is an exploded view similar to FIG. 2 and showing the individual parts of the assembly;

Figure 1:
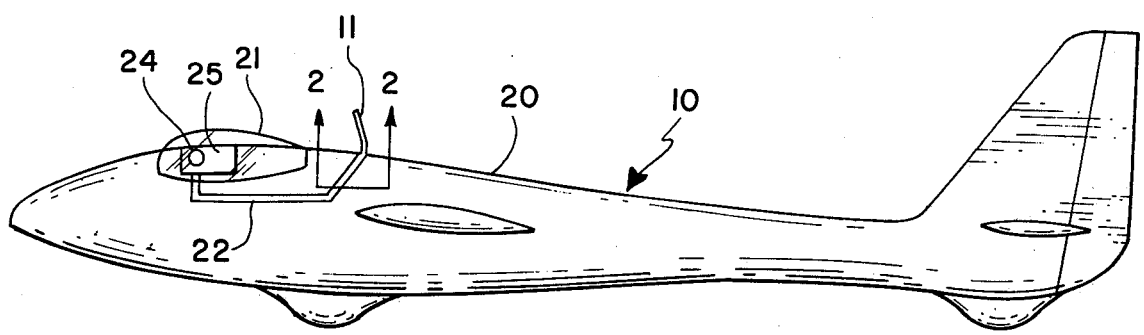
FIG. 1 is a schematic representation of a sailplane with the total energy sensor of the present invention.

Referring now to the drawings and more particularly to FIG. 1, there is shown an exemplary sailplane generally designated by reference numeral 10 equipped with the total energy sensor according to the present invention. The total energy sensor probe in the illustrated embodiment is designated by reference numeral 11 and is disposed on fuselage 20 of said plane 10 just aft of canopy 21. Sensor probe 11 is in fluid communication via conduit 22 with a sensitive variometer or rate of climb instrument 24. Variometer 24 is positioned on instrument panel 25 within the sailplane and in position to be visible to the pilot.

Referring now more particularly to FIGS. 2 and 3, it is readily seen that probe 11 is of cylindrical or tubular configuration and has a closed end 12 and an open end 13. Closed end 12 of probe 11 is inclined 20° forward relative to the direction of flight of aircraft 10 as noted by the arrow labeled "airflow" while open end portion 13 is perpendicularly disposed relative to fuselage 20. An orifice 15 is formed in the aft surface of tubular probe 11 a specific distance from the closed end 12 thereof as will be further explained hereinafter.

A mounting tube 27 extends through an aperture 28 formed in fuselage 20 of aircraft 10. Mounting tube 27 is provided with a washer or fairing 30 soldered or otherwise sealed to the exterior thereof and adapted to sealingly engage aperture 28 at the exterior of fuselage skin 20. An exteriorly threaded tubular fitting 31 is soldered or otherwise sealingly secured to mounting tube 27 adjacent washer 30 and extending to the interior of fuselage 20. A threaded nut 33 and a washer 34 are positioned on tubular fitting 31 so as to firmly secure mounting tube 27 fixed relative to fuselage 20. The end portions of mounting tube 27 extend through the fuselage skin 20 so as to present an exposed end 27a on the exterior of skin 20 with the other end 27b of tube 27 being disposed within fuselage 20. Exposed end 27a of mounting tube 27 is diagonally or bias cut with the diagonal portion sloping rearward relative to the longitudinal axis or direction of flight for aircraft 10, as will be further explained hereinafter.

The interior diameter of mounting tube 27 and the outside diameter of probe 11 are essentially equal so as to provide a tight sliding fit therebetween when probe 11 is secured to the aircraft fuselage 20 (FIG. 2).

An external sleeve 36 is positioned around a portion of probe 11 and secured spaced from open end 13 thereof so as to limit the length of probe 11 that extends into mounting tube 27. Sleeve 36 is soldered or otherwise conventionally secured to probe 11 to prevent relative sliding movement therebetween and to insure the same orientation of probe 11 relative to the axis of sailplane 10. Mounting tube 27 and sleeve 36 are of essentially identical internal and external dimensions and a diagonal or bias end 36a is provided on sleeve 36 to mate with diagonal end face 27a of tube 27 when probe 11 is inserted therein. The matching surfaces 27a and 36a provide for mounting adjustment to allow probe 11 to always maintain a forward slope relative to the longitudinal axis or direction of flight for aircraft 10. A tubular connector 39 is disposed around the mating portions of 27a and 36a of sleeve 36 and mounting tube 27 to provide a hermatic seal between these parts. Connector 39 also serves to keep probe 11 tightly engaged with mounting tube 27 and this, along with the diagonal mating faces 27a and 36a, prevents probe 11 from rotating during aircraft flight.

As readily seen in FIGS. 2 and 3, probe 11 is easily installed and may be removed when the aircraft is in storage or non-flight status for protection thereof. When removed, a suitable closure, such as a length of sealed tubing, or the like, may be used to seal end 13 of probe 11 and end 27a of mounting tube 27 to insure that no trash enters the parts.

Figure 4:
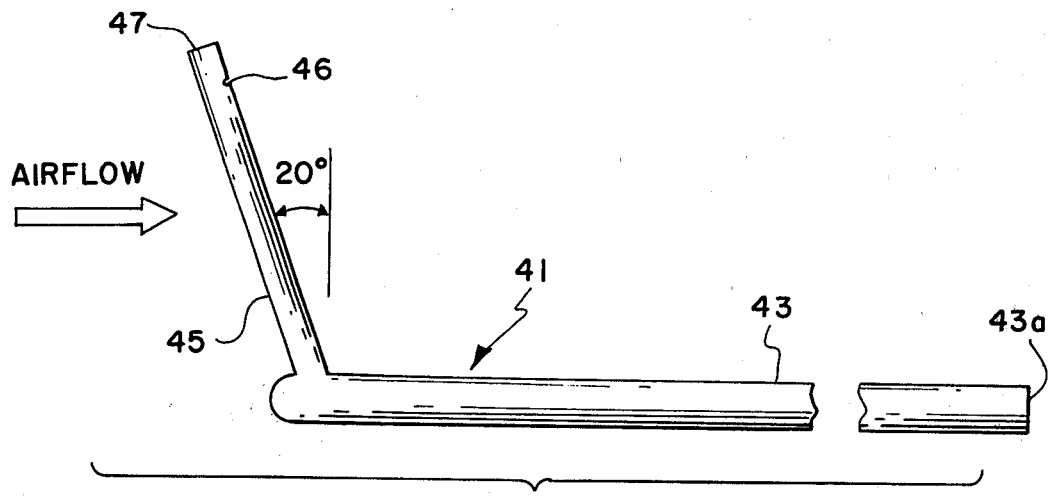
FIG. 4 is a view of a modification of a total energy sensor probe according to the present invention.

Referring now to FIG. 4, an alternate embodiment of the total pressure sensor probe is shown and designated generally by reference numeral 41. Probe 41 includes an elongated tubular segment 43 having an open end 43a. Elongated segment 41 is disposed parallel with the direction of airflow during operation as represented by the arrow. An integrally attached probe extension 45 of elongated segment 43 and in fluid communication therewith extends into the airflow at the same angular relationship with respect to the vertical as probe 11 described hereinabove. Probe extension 45 is provided with an orifice 46 in the aft surface and spaced a distance from the closed end 47 thereof. As in the previous embodiment, orifice 46 serves as a pressure source that appropriately combines the pressures related to aircraft altitude and velocity to provide total energy indications to the attached variometer.

Figure 5:
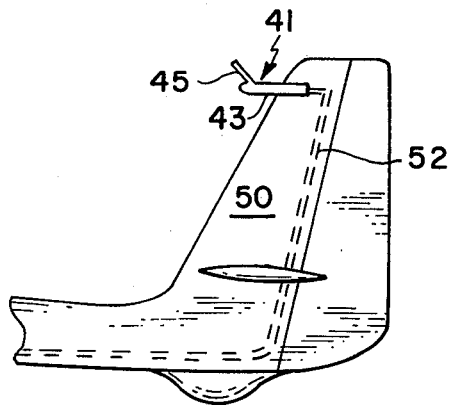
FIG. 5 is a schematic view of one mounting location for the probe shown in FIG. 4.

Referring now more particularly to FIG. 5, one suitable mounting location for the probe shown in FIG. 4 is illustrated. As shown therein the elongated segment 43 of total pressure probe 41 is secured at the open end thereof to the vertical tail 50 of an aircraft in such position as to dispose angular extension 45 into the free stream airflow. Suitable conduit 52, leading through vertical tail 50, connects total energy probe 41 to a sensitive variometer on the aircraft instrument panel (not shown) as in the previously described embodiment.

Although no specific materials have been mentioned for constructing the proble of the present invention, brass, steel, and stainless stell tubing have been used in the examples tested to date. Tube diameters tested in construction the present invention were 3/16 inch 7/32 inch and ¼ inch. Conventional solder was used to plug the ends 12 and 47 and, in some instances, a small wad of steel wool or brass scraps were inserted into the end prior to soldering to assist in holding the solder in place. After soldering, all tubes tested were filed off normal to the tube and slightly beveled. Holes were drilled in the tubes tested with high-speed drills and deburred. Various size holes from 1/32 inch to ⅛ inch were tested. Various distances of the holes from the closed tube end were tested with all measurements being made from the center of the holes. Various angular settings of the probe relative to the air flow in a wind tunnel were tested. The three-dimensional effects on pressure coefficients that result from having the holes near the end of the tube led to the finding that certain hole locations would give the desired coefficient. It was thus determined that probes having a forward sweep of about 20° and pressure holes located such that $X/D = 2$ gave the desired pressure coefficient of $C_p = -1.0$ (where X is equal to the distance of the hole from the tube closed end and D is equal to the tube diameter).

In the specific embodiments illustrated, probe 11 is normally five to 6 inches in length and is formed of 3/16 inch diameter brass tubing, orifice 15 is 1/16 inch diameter and is formed on the aft surface and ⅜ inch from closed end 12. In the embodiment of FIG. 4 a twelve inch length of ⅜ inch diameter brass tubing is used for elongated segment 43. Extension 45 is soldered to segment 43 and is formed of 3/6 inch diameter tubing with orifice 46 being 1/16 inch diameter on the aft surface thereof ⅜ inch from closed end 47.

Further details and test results for other size tubing, orifice angular and linear locations and size, and probe angular settings are set forth in NASA TMX-73928 published March 1976. It suffices to say here that for a range of velocities from 40 to at least 150 miles per hour and for altitudes from sea level to at least 20,000 feet, a probe diameter of 3/16 inch is satisfactory. For this diameter, an aft facing orifice 1/16 inch in diameter should be located ⅜ inch from the end of the probe and the probe swept forward 20°. Larger diameter probes tested also provided the desired total energy compensation but they also produce proportionately high drag values than the 3/16 inch diameter tubes.

The various fittings for probe 11 may be formed from brass or other suitable metal with the exception of the conduit tubing 22 leading from the probe to the variometer and tubular connector 39 (FIGS. 2 and 3). These members are formed of suitable flexible plastics or the like to insure a leak-proof sealed pressure measurement conduit since the total energy indication is extremely sensitive to leaks. Also, all soldered connections and the soldered end 12 of probe 11 and end 47 of probe 45 must be free from leaks.

Most flight tests of the present invention have been conducted with a Schweizer 1-26B sailplane and a Ball Electric Variometer Model 101-D. However, some flights have also utilized the Winter and PZL variometers, and a probe according to the present invention has been substituted for the Althaus probe that is mounted on the forward fin of the Standard Libelle with excellent results.

The specific location of the total energy probe may be varied but for the Schweizer 1-26B and the Standard Libelle the fin location positioning the probe tip in the free stream air, such that the probe measurement is not affected by the changes in pressure over the wing and body, appear to give slightly better results than other fuselage locations.

For both embodiments illustrated (FIGS. 2 and 4), smoothly executed zooms during flight testing resulted in a steady change in rate of sink readings between the correct values for speeds at beginning of zooms to the proper sink rates for thermalling speeds. Also, no excessive overshoots in climb or sudden increases in sink rate were exhibited during zooms. Similar results were obtained from pushovers from thermalling speeds to various cruise speeds and during rapid transients with elevator movement, rudder movement, and sideslip. In addition, loops, lazy eights, and others coordinated maneuvers involving changing speed and altitude gave good qualitative checks during transient conditions. Although no flight tests have been conducted to date above 10,000 feet, no variations were noticed nor expected as a result of altitude changes.

The spectrum of cross country speeds for sailplanes is normally from about 40 miles per hour to 150 miles per hour, and at altitudes from sea level to about 20,000 feet. For this spectrum of speeds and altitudes, ratios of Reynolds number to diameter, $R/d$, (usually referred to as unit Reynolds number) fall within values of $2.5 \times 10^5/\text{ft}$ and $16 \times 10^5/\text{ft}$. In actual practice, the most important region for compensation ranges between $R/d$ values of $5 \times 10^5/\text{ft}$ to $10 \times 10^5/\text{ft}$. For 3/16-inch diameter sensors, this results in Reynolds numbers ranging from about 8,000 to 16,000.

The drag for a 3/16 inch diameter probe 5 inches long and having a 20° forward sweep angle on an aircraft having a speed of 100 mph at 5000 feet altitude was computed by standard techniques to be approximately one-tenth of a pound. It is thus seen that the drag is negligible for sailplanes and most other aircraft, traveling at relative low speeds. However, for jet propelled or other high speed aircraft that would increase the drag, the probe could be conventionally retracted during the high speed flight regime and extended only during the low speed landing approaches. Along these lines, although the invention has been described with specific emphasis on sailplanes, it is equally applicable for other aircraft where total energy availability is desired for optimum flight operations. The pressure signal from a total energy sensor as described herein can be used to provide information on wind shear or airspeed changes due to atmospheric disturbances. When on final approach, reaction to such disturbances in a timely manner can be critical. The simple total energy sensor of the present invention offers a sensitive signal for providing a pilot indications of such occurrences so that corrective actions can be taken quickly and surely. The signal from such a sensor may also be coupled directly with aircraft controls such as the auto throttle or aerodynamic controls to effectt an immediate response to atmospheric conditions which adversely affect the flight path and flight conditions, especially during approach and landing. The integration of static and dynamic pressures by the simple total energy sensor of the present invention is unique in providing sensitive, quick response information for such purposes. Thus, the present invention is particularly useful for pilot analysis of shear and gust loads on aircraft during final landing approach.

From the foregoing, it is readily seen that the present invention provides a total energy sensor that, when coupled with a good variometer in a leak-free system, provides good total energy rate information to the pilot of an aircraft over a flight range from 40 to at least 150 mph and at altitudes from sea level to at least 20,000 feet. Further, the total energy probe described herein is insensitive to yaw, pitch and roll attitude variations and drag of a typical installation at 100 mph is only about one-tenth of a pound.

Although the invention has been described relative to specific embodiments thereof, it is not so limited and many modifications and variations thereof will be readily apparent to those skilled in the art in the light of the above teachings. Thus, changes in the materials used, the dimensions given in the specific examples and the mounting locations described may be changed without departing from the spirit or scope of the present invention. It is therefore to be understood that within the scope of the appended claims, the invention may be practiced otherwise than as specifically described herein.

What is claimed as new and desired to be secured by Letters Patent of the United States is:

1. An energy sensor probe for providing a signal representative of changes in useful total energy for an aircraft during flight comprising:
    an elongated tubular member positioned on the exterior of the aircraft and having an open end and a closed end,
    said closed end of said tubular member being angularly inclined forward relative to the direction of flight of the aircraft and provided with a single orifice formed in the aft portion thereof and spaced from said closed end,
    said open end of said tubular member being in fluid connection with a sensitive variometer whereby, during aircraft flight the laminar air flow around said tubular member produces pressures which vary with changes in aircraft velocity and altitude that are proportional to changes in total energy pressure and these changes being detected by the energy sensor probe and indicated by the variometer.

2. In combination, an aircraft and a variometer provided on the instrument panel thereof to provide readings of the available total energy air pressure available during flight of the aircraft at a given instant, the improvement therewith consisting of:
    a total energy pressure probe exteriorly disposed on the aircraft,
    said total energy pressure probe being an elongated tubular member having an open end portion and a closed end portion,
    the open end portion of said tubular member being secured to the aircraft fuselage so as to be in fluid communication with the variometer and the closed end portion of said tubular member extending into the free airstream about the aircraft,
    said closed end portion of said tubular member being provided with a single orifice disposed in the aft cylindrical portion thereof and spaced from the closed end thereof,
    whereby, laminar flow around the tubular member produces pressures that vary with changes in aircraft velocity and altitude proportional to changes in total energy and these pressure changes are transmitted through the total energy pressure probe to the aircraft variometer.

3. The combination of claim 2 wherein said open end portion of said tubular member is disposed perpendicular to the aircraft fuselage and said closed end portion of said tubular member is inclined angularly toward the direction of flight of the aircraft.

4. The combination of claim 3 wherein said closed end portion of said tubular member is inclined 20° angularly forward relative to said open end portion of said tubular member.

5. The combination of claim 2 wherein the single orifice disposed in the aft cylindrical portion of said tubular member is positioned a distance from said closed end thereof such that $X/D = 2$ where X is equal to the distance of the orifice center from the closed tubular end and D is equal to the diameter of said tubular member.

6. The combination of claim 2 including means for releasably securing said tubular member to the aircraft fuselage and serving to maintain the same orientation of said tubular member relative to the longitudinal axis of the aircraft.

7. The combination of claim 2 including a mounting tube extending through the aircraft fuselage for releasably securing said tubular member to the aircraft fuselage, said mounting tube having an internal diameter substantially equal to the external diameter of said tubular member and adapted to slidably receive the open end and a length of said tubular member.

8. The combination of claim 7 wherein said mounting tube is provided with a diagonal end face at the end thereof extending exterior of the aircraft fuselage, a sleeve member rigidly secured to said tubular member a distance spaced from the open end thereof, said sleeve member having an interior diameter substantially equal to the external diameter of said tubular member and provided with a diagonal end face adapted to abut against and mate with the diagonal end face of said mounting tube when said tubular member is slidably positioned therein to thereby limit the distance said tubular member extends into said mounting tube.

9. The combination of claim 8 and further including a flexible tubular connector slidably positioned over said sleeve member and said mounting tube at the mating faces thereof when said tubular member is positioned within said mounting tube to thereby provide a hermatic seal between these parts.

10. The combination of claim 9 including a flexible tubular conduit connecting said mounting tube to the aircraft variometer.

11. The combination of claim 7 including means for fixedly securing said mounting tube to the aircraft fuselage, said means including a fairing washer disposed about said mounting tube and abutting against the exterior of the aircraft fuselage, said fairing washer being secured to said mounting tube, an exteriorly threaded fitting slidably disposed about the length of said mounting tube extending into the interior of the aircraft fuselage, said fitting being bonded to said fairing washer, an internally threaded nut threadingly secured to said threaded fitting, and a washer disposed between said threaded nut and the interior of the aircraft fuselage and adapted to tightly engage the interior of the aircraft fuselage when said threaded nut is tightened to thereby secure said mounting tube to the fuselage.

* * * * *